United States Patent [19]

Takada

[11] 4,146,838
[45] Mar. 27, 1979

[54] SYSTEM FOR DETECTING BY A FIRST PILOT AND A GROUP OF SECOND PILOTS CORRELATED TO THE FIRST A FREQUENCY AND/OR PHASE DIFFERENCE BETWEEN RELAYED CARRIERS

[75] Inventor: Masami Takada, Tokyo, Japan

[73] Assignee: Nippon Electric Company Ltd., Tokyo, Japan

[21] Appl. No.: 830,627

[22] Filed: Sep. 6, 1977

[30] Foreign Application Priority Data

Sep. 7, 1976 [JP] Japan ................................ 51-107552

[51] Int. Cl.² ................................ H04B 7/14; 333 2
[52] U.S. Cl. .......................................... 325/3; 325/9; 325/60

[58] Field of Search ............ 178/15 BP, 15 FE, 16 E, 178/170 A, 170 HF; 325/3, 9, 10, 11, 60, 472, 473, 474; 343/100 PE

[56] References Cited

U.S. PATENT DOCUMENTS

| | | | |
|---|---|---|---|
| 3,735,266 | 5/1973 | Amitzy | 325/60 |
| 3,986,123 | 10/1976 | Tinno et al. | 325/56 |
| 4,090,137 | 5/1978 | Somz et al. | 325/60 |

Primary Examiner—Robert L. Griffin
Assistant Examiner—Peter Durigon
Attorney, Agent, or Firm—Ostrolenk, Faber, Gerb & Soffen

[57] ABSTRACT

A plurality of pilot signals having predetermined relations are used to remove a phase-frequency difference introduced into transmission signals by one or more repeaters in a high frequency radio link. The pilot signals are also used to compensate for crosstalk introduced into respective pairs of said transmission signals.

1 Claim, 7 Drawing Figures

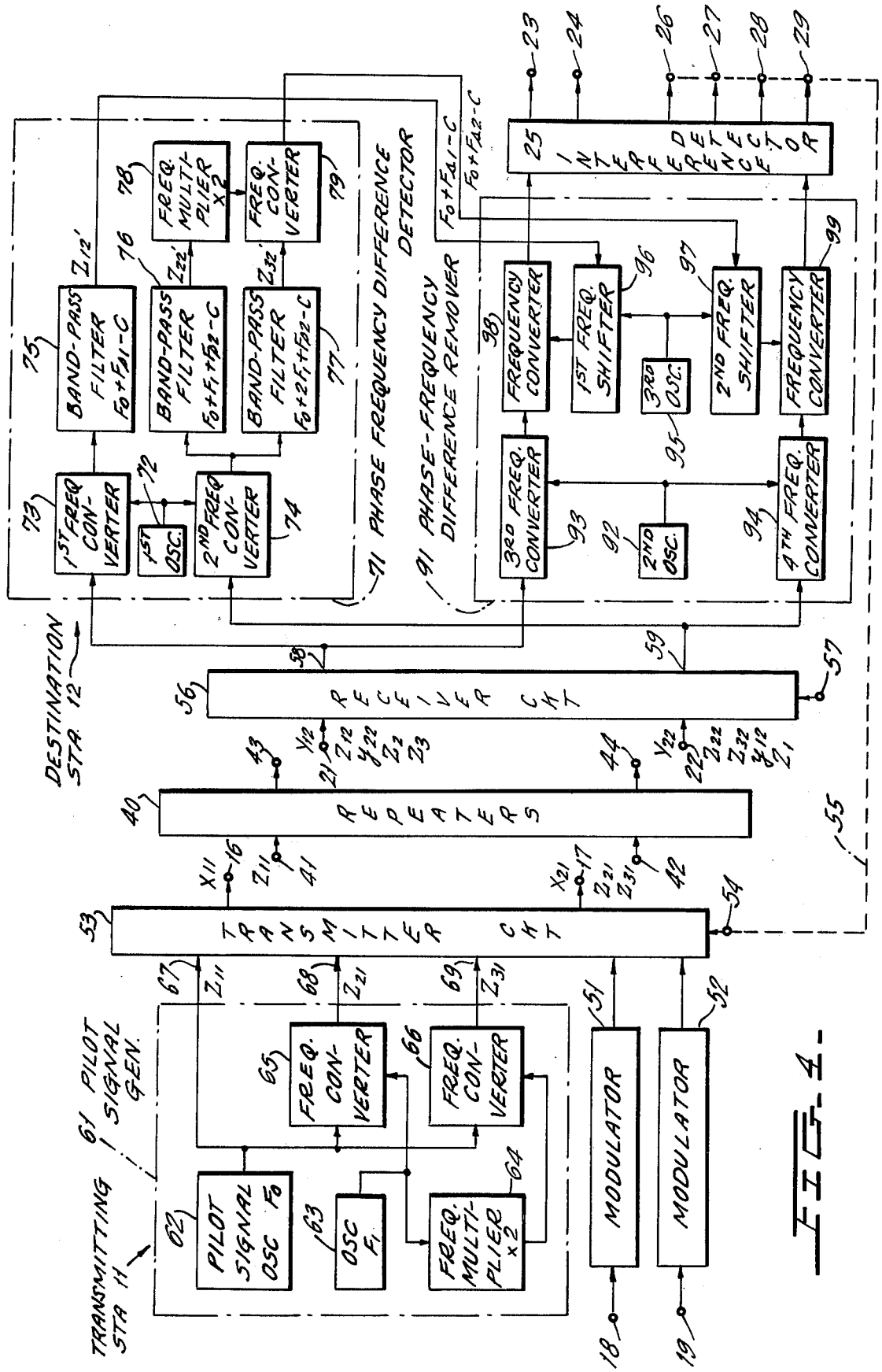

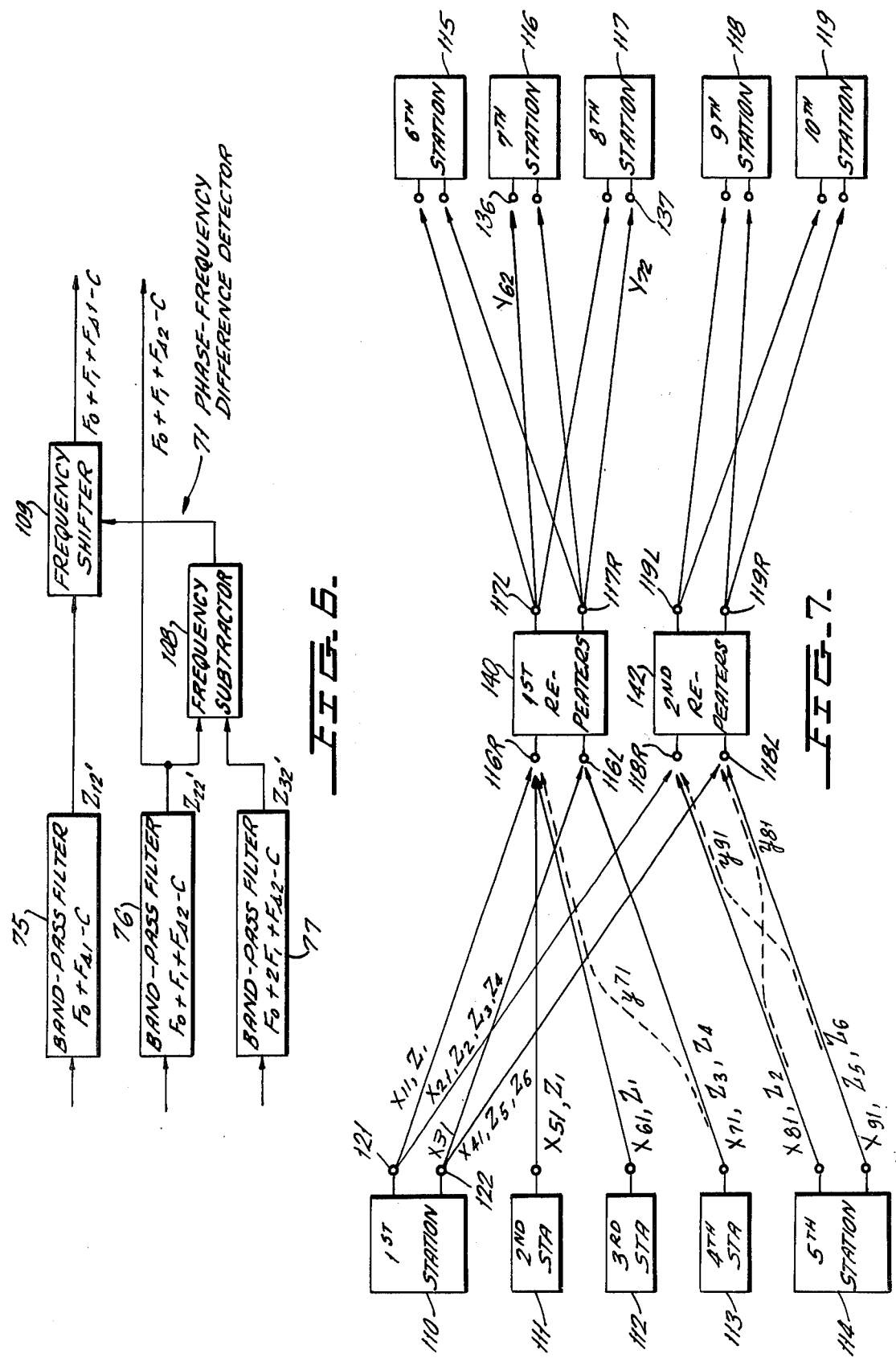

SYSTEM FOR DETECTING BY A FIRST PILOT AND A GROUP OF SECOND PILOTS CORRELATED TO THE FIRST A FREQUENCY AND/OR PHASE DIFFERENCE BETWEEN RELAYED CARRIERS

BACKGROUND OF THE INVENTION

This invention relates to a system for detecting or determining, in a receiver of a radio communication system or link a frequency and/or phase difference generally produced between each pair of communication signals reaching the receiver in a common frequency band through at least one repeater station of the link and for thereby enabling cancellation or compensation of interference which inevitably occurs between the communication signals before reaching the receiver.

In a conventional terrestrial microwave communication link comprising a transmitting or origination station, at least one repeater station, and a receiving or destination station, the frequency and/or phase difference has given rise to no serious problems in general because the communication signals reaching the receiver through different propagation paths or communication channels have been well separable by directivities of antenna beams and/or carrier frequencies of the communication signals. In order to more effectively use the frequencies, it has become the practice to resort to a narrower carrier frequency spacing in which the communication signals are not readily separable by the carrier frequencies. Even for these communication signals, separation is possible by the antenna directivity discrimination and also by polarization discrimination which makes use of carrier electromagnetic waves or signals of cross-polarized modes. The separation is, however, likely to deteriorate the quality of the link performance when interference becomes serious between the communication channels as a result of various inevitable adverse effects caused by the conditions of the communication channels. For example, rain inevitably introduces differences in the phase and the amplitudes of the cross-polarized carrier signals and consequently in the mode of polarization of the communication signals to damage the polarization discrimination. Variations inevitable in the atmospheric conditions result, in turn, in variations in scatter, reflection, and other manners of propagation of the carrier signals to degrade the directivity discrimination and also the polarization discrimination. The situations are similar even in a satellite communication link in which transponders carried by a satellite serve as repeater station. It is therefore necessary to detect the interference in a receiver of the destination and/or repeater station to compensate the interference in the destination, repeater, and/or origination station.

A system for detecting interference signals resulting from the inevitable interference between cross-polarized electromagnetic waves, such as a dextrorotary and a levorotary elliptically polarized waves, of a common frequency band is disclosed in U.S. Pat. No. 3,735,266 issued to Noach Amitay, an assignor to Bell Telephone Laboratories, incorporated, or in U.S. Pat. No. 4,090,137 issued to Shoji Soma and Ikuro Sato, assignors to the present assignee. Pilot carrier signals of different frequencies are transmitted as the respective cross-polarized waves. In a receiving station, the pilot carrier signals and interference signals occurring across the cross-polarized channels are detected for comparison between their respective phases or amplitudes to determine levels of the interference signals. The disclosed system is applicable in general to a communication link comprising a transmitting station and the receiving station and no repeater station although possibility of inclusion of one or more repeater stations is mentioned in the referenced United States Patent. For example, the proposed system is applicable in a satellite communication link only to a down link and not to a whole link comprising an up link and the down link.

The incapability of detecting the interference signals in a destination station of a radio communication link comprising a repeater station results from the fact that the repeater station usually carries out frequency conversion of the communication signals arriving thereat generally with another common frequency to give rise to the frequency and/or phase difference mentioned hereinabove. This is typically the case when the communication signals are received at the destination station through a plurality of repeaters. Detection and compensation of the frequency and/or phase difference are accordingly mandatory.

SUMMARY OF THE INVENTION

It is therefore an object of the present invention to provide a system for detecting, in a receiver of a radio communication link comprising a repeater station, a frequency and/or phase difference introduced at the repeater station or stations into each pair of communication signals reaching the receiver in a common frequency band.

It is another object of this invention to provide a system of the type described, which is capable of compensating interference which inevitably occurs between the communication signals before reaching the receiver.

A system to which this invention is applicable is for a radio communication link comprising transmitting means for transmitting a plurality of transmitter output signals in a first common frequency band, repeater means for receiving the transmitter output signals as repeater input signals and the transmitting the repeater input signals in a second common frequency band as repeater output signals with frequency conversion carried out between the repeater input signals and the respective repeater output signals, and a receiver for receiving the repeater output signals as receiver input signals. The system comprises pilot transmission means in the transmitting means for transmitting a plurality of transmission pilot carrier signals together with the transmitter output signals and pilot reception means in the receiver for separating those reception pilot carrier signals from the receiver input signals which result from the respective transmission pilot signals. The transmitter output signals comprise a first and a second transmitter output signal. The receiver input signals comprise a first and a second receiver input signal resulting from the first and second transmitter output signals, respectively, and having a phase-frequency difference therebetween as a result of the frequency conversion. The reception pilot carrier signals are for use in cancelling from one of the first and second receiver input signals an interference signal inevitably introduced into the above-mentioned one receiver input signal from one of the first and second transmitter output signals that results in the other of the first and second receiver input signals.

According to this invention, the pilot signal transmission means comprises pilot signal generating means for generating at least one first transmission pilot signal and at least two second transmission pilot signals having predetermined correlations, respectively, with the first transmission pilot signal. The pilot signal transmission means further comprises means for transmitting the first transmission pilot signal and the second transmission pilot signals as said transmission carrier signals together with the first and second transmitter output signals, respectively. The pilot signal reception means comprises first means for separating as the reception pilot carrier signals a first reception pilot signal and second reception pilot signals from the first and second receiver input signals, respectively. The first and second reception pilot signals result from the first and second transmission pilot signals, respectively. The phase frequency difference is provided between the first reception pilot signal and the second reception pilot signals by the frequency conversion to which the first and second transmission pilot signals are subjected together with the repeater input signals at the repeater means. The pilot reception means further comprises second means responsive to the first and second reception pilot signals for detecting the phase-frequency difference by the use of the correlations.

The receiver may be comprised either by a destination station of the link or by a repeater station of the link for further repeating the above-mentioned repeater output signals towards the destination station. The second common frequency may be coincident with the first common frequency. In such a case, the frequency conversion as called herein may be between first carrier signals for the respective repeater input signals and those second carrier signals for the respective repeater output signals which are equal in frequency to the respective first carrier signals. In any event, the phase-frequency difference mentioned above means a difference in frequency and/or phase between the first carrier signals and the second carrier signals to which the first carrier signals are converted at the repeater means. The repeater means may comprise a repeater station or two or more remote repeater stations. The reception pilot signals may further be used to cancel another interference signal that is inevitably introduced into the other of the first and second receiver input signals in the manner set forth hereinabove.

BRIEF DESCRIPTION OF THE DRAWING

FIG. 4 is a block diagram of the communication link depicted in FIG. 3 together with a system according to a first embodiment of this invention;

FIG. 6 is a block diagram of a modification of an angular frequency difference detector of the system shown in FIG. 4; and FIG. 7 is a block diagram of a radio communication link to which a system according to a second embodiment of this invention is applied.

DESCRIPTION OF THE PREFERRED EMBODIMENTS

Figure 1:
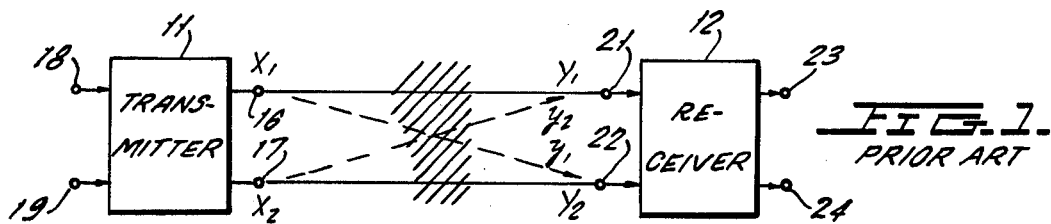
FIG. 1 schematically shows inevitable occurrence of interference across a plurality of communication channels of a conventional radio communication link.

Referring to FIG. 1, a sophisticated radio communication link or system comprises a transmitting or origination station 11 and a receiving or destination station 12. The origination station 11 has a pair of transmitter output terminals 16 and 17 for transmitting information signals supplied from a pair of transmitter input terminals 18 and 19, respectively, on a pair of carrier electromagnetic waves or signals of a common frequency band as transmitter output signals $X_1$ and $X_2$ through a pair of propagation paths or communication channels with polarization discrimination and/or antenna beam directivity discrimination. The signals $X_1$ and $X_2$ reach a pair of receiver input terminals 21 and 22 of the destination station 12 as receiver input signals $Y_1$ and $Y_2$. In this link, the input signals $Y_1$ and $Y_2$ are separable from each other in the destination station 12 in whichever of the polarization and the antenna directivity discriminations. Carrying out separation, the destination station 12 reproduces the original information signals and supplies the same to a pair of receiver output terminals 23 and 24. During transmission, interference signals $y_1$ and $y_2$ are introduced by rain or other variations in conditions of the communication channels indicated by a hatched area from the respective output signals $X_1$ and $X_2$ into the input signals $Y_2$ and $Y_1$, respectively, and linearly superposed thereon. The interference signals $y_1$ and $y_2$ have absolute values $|y_1|$ and $|y_2|$ and phases $\hat{y}_1$ and $\hat{y}_2$ which fluctuate according as the conditions fluctuate. When the input signals $Y_1$ and $Y_2$ and the interference signals $y_1$ and $y_2$ superposed on the input signals $Y_2$ and $Y_1$, respectively, result as herein exemplified from the output signals $X_1$ and $X_2$, respectively, it is possible to decide in the destination station 12 the absolute values $|y_1|$ and $|y_2|$ and the phases $\hat{y}_1$ and $\hat{y}_2$ from the input signals $Y_1$ and $Y_2$ and to compensate the interference by cancelling the interference signals $y_1$ and $y_2$ from the respective input signals $Y_2$ and $Y_1$.

Figure 2:
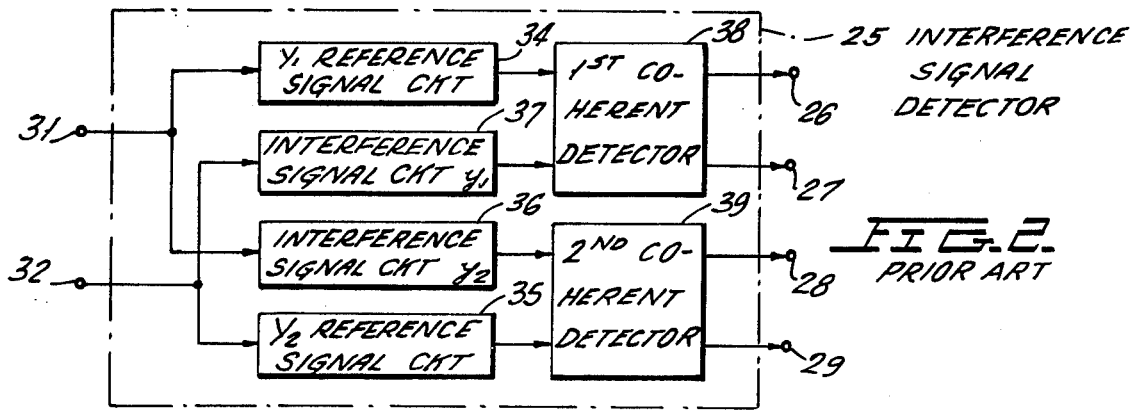
FIG. 2 is a block diagram of a conventional detector for detecting interference signals resulting from the interference.

Turning to FIG. 2, a conventional detector 25 is shown for detecting in the destination station 12 depicted in FIG. 1 the absolute values $|y_1|$ and $|y_2|$ and the phases $\hat{y}_1$ and $\hat{y}_2$ of the interference signals $y_1$ and $y_2$ received at the respective receiver input terminal 22 and 21 by the use of the receiver input signals $Y_1$ and $Y_2$ received at the respective receiver input terminals 21 and 22. The detector 25 has detector output terminals 26, 27, 28, and 29 and detector input terminals 31 and 32. Merely for simplicity of description, it is surmised that the detector input terminals 31 and 32 are connected directly to the respective receiver input terminals 21 and 22. First and second reference signal producing circuits 34 and 35 are connected to the respective detector input terminals 31 and 32 to produce reference signals for the receiver input signals $Y_1$ and $Y_2$, respectively. First and second interference signal producing circuits 36 and 37 are connected to the detector input terminals 32 and 31, respectively, to produce the respective interference signals $y_1$ and $y_2$. A first coherent detector 38 is connected to the first reference and interference signal producing circuits 34 and 36 to supply the detector output terminals 26 and 27 with control signals representative of an inphase and a quadrature phase component of the interference signal $y_1$ received at the receiver input terminal 22 with respect to the receiver input signal $Y_1$ received at the other receiver input terminal 21. A second coherent detector 39 is connected to the second reference and interference signal producing circuits 35 and 37 to supply the detector output terminals 28 and 29 with other control signals representative of an inphase and a quadrature phase component of the other interference signal $y_2$ received at the receiver input terminal 21 with respect to the receiver input signal $Y_2$ received at the other receiver input terminal 22. It is possible by feeding the control signals from the detector output terminals 26 through 29 either back or forward to a cancellation circuit (not shown) to compensate the interference signals as taught in the Amitay patent or in the Soma et. al. patent.

Figure 3:
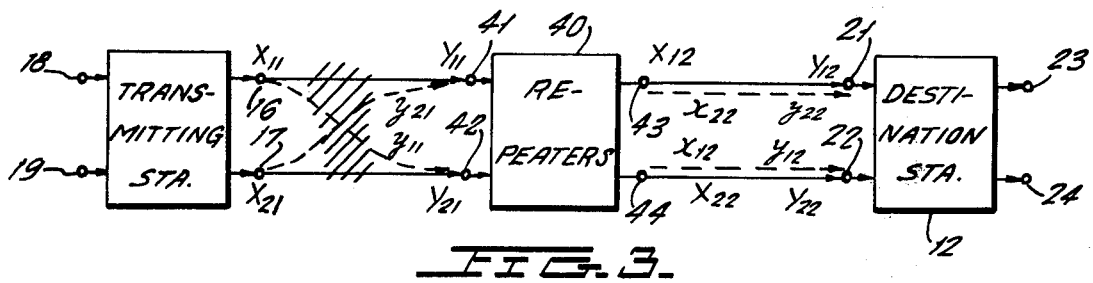
FIG. 3 schematically illustrates in blocks inevitable production of interference signals in a radio communication link to which a system according to the present invention is applicable.

Referring now to FIG. 3, a radio communication link to which the present invention is applicable comprises an origination station 11 and a destination station 12 having transmitter output and input terminals 16 through 19 and receiver input and output terminals 21 through 24 as illustrated with reference to FIG. 1. The link further comprises a repeater station 40 having repeater input terminals 41 and 42 and repeater output terminals 43 and 44. Generally, the input and output terminals 41 and 43 and the other input and output terminals 42 and 44 are of different repeaters. The origination station 11 sends from the transmitter output terminals 16 and 17 transmitter output signals $X_{11}$ and $X_{21}$, which reach the repeater input terminals 41 and 42 as repeater input signals $Y_{11}$ and $Y_{21}$, respectively. In the example being illustrated, first interference signals $y_{11}$ and $y_{21}$ are introduced from the respective output signals $X_{11}$ and $X_{21}$ into the input signals $Y_{21}$ and $Y_{11}$, respectively. The repeater station 40 carries out frequency conversion of the signals received at the repeater input terminals 41 and 42 independently of each other to retransmit or repeat the input signal $Y_{11}$ together with the accompanying first interference signal $y_{21}$ as a repeater output signal $X_{12}$ and an accompanying repeated interference signal $x_{22}$ with a first conversion difference $F_{s1}$ and to repeat the other input signal $Y_{21}$ together with the accompanying first interference signal $y_{11}$ as another repeater output signal $X_{22}$ and another accompanying repeated interference signal $x_{12}$ with a second conversion difference $F_{s2}$ independent of the first one $F_{s1}$. The repeater output signals $X_{12}$ and $X_{22}$ thus have a frequency and/or phase difference $F_{s1} \sim F_{s2}$ therebetween. The repeater output signals $X_{12}$ and $X_{22}$ and the repeated interference signals $x_{22}$ and $x_{12}$ reach the receiver input terminals 21 and 22 as receiver input signals $Y_{12}$ and $Y_{22}$ and as second interference signals $y_{22}$ and $y_{12}$, respectively. Although the relations between the repeater input signal $Y_{11}$ and the first interference signal $y_{21}$ superposed thereon and between the other repeater input signal $Y_{21}$ and the first interference signal $y_{11}$ superposed thereon are kept between the repeater output signal $X_{12}$ and the repeated interference signal $x_{22}$ superposed thereon and between the other repeater output signal $X_{22}$ and the repeated interference signal $x_{12}$ superposed thereon, respectively, correlations are lost as a result of the independent frequency conversion between the carrier signals for the repeater input and the resulting repeater output signals $Y_{11}$ and $X_{12}$ and between the carrier signals for the other repeater input signal $Y_{21}$ and the corresponding repeater output signal $X_{22}$ to upset correlations between the receiver input signal $Y_{12}$ reaching the receiver input terminal 21 and the second interference signal $y_{12}$ reaching the other receiver input terminal 22 and between the receiver input signal $Y_{22}$ and the second interference signal $y_{22}$ superposed on the other receiver input signal $Y_{12}$. This renders it impossible to decide in the destination station 12 the absolute values and the phases of the second interference signals $y_{12}$ and $y_{22}$ by the use of the receiver input signals $Y_{12}$ and $Y_{22}$.

Further referring to FIG. 3 by way of example, this invention makes it possible to detect at the destination station 12 the frequency and/or phase difference $F_{s1} \sim F_{s2}$ and to cancel in effect the first and second mutually independent conversion differences $F_{s1}$ and $F_{s2}$ from the respective receiver input signals $Y_{12}$ and $Y_{22}$. It is thereby rendered possible to regard the relations between the receiver input signal $Y_{12}$ and the second interference signal $y_{12}$ superposed on the other receiver input signal $Y_{22}$ and between the other receiver input signal $Y_{22}$ reaching the receiver input terminal 22 and the second interference signal $y_{22}$ reaching the other receiver input terminal 21 as the relations between the receiver input signal $Y_1$ described in conjunction with FIG. 1 and the interference signal $y_1$ superposed on the other receiver input signal $Y_2$ and between the other receiver input signal $Y_2$ reaching the receiver input terminal 22 and the interference signal $y_2$ reaching the other receiver input terminal 21 and to detect in the destination station 12 absolute values $|y_{12}|$ and $|y_{22}|$ and phases $\hat{y}_{12}$ and $\hat{y}_{22}$ of the second interference signals $y_{12}$ and $y_{22}$ by the use of the receiver input signals $Y_{12}$ and $Y_{22}$. The detected values serve to compensate the interference signals $y_{12}$ and $y_{22}$.

Referring to FIG. 4, origination and destination stations 11 and 12, transmitter output and input terminals 16 through 19, receiver input and output terminals 21 through 24, a conventional interference signal detector 25 having detector output terminals 26 through 29, a repeater station 40, and repeater input and output terminals 41 through 44 illustrated with reference to FIGS. 2 and 3 are again depicted. It is to be understood here that the above-mentioned reference signals produced in the detector 25 should now be for the receiver input signals $Y_{12}$ and $Y_{22}$ rather than for the receiver input signals $Y_1$ and $Y_2$ described in conjunction with FIGS. 1 and 2 and that the original information signals are reproduced from the reference signals for the receiver input signals $Y_{12}$ and $Y_{22}$ in question. The origination station 11 comprises modulator 51 and 52 for modulating carrier signals of a common frequency band with the information signals supplied thereto from the transmitter input terminals 18 and 19 to supply the modulated carrier signals to a known transmitter circuit 53 for supplying the modulated carrier signals to the transmitter output terminals 16 and 17 as the transmitter output signals $X_{11}$ and $X_{21}$. The transmitter circuit 53 has a control input terminal 54 to pre-compensate the above-mentioned first interference signals $y_{11}$ and $y_{21}$ by first control signals produced in the interference signal detector 25 in a manner later described and fed from the detector output terminals 26 through 29 as far back as to the control input terminal 54 through a line 55 which may be a terrestrial line or a channel passing through the repeater station 40 or another repeater station (not shown). The destination station 12 comprises a known receiver circuit 56 for separating the signals received at the receiver input terminals 21 and 22 into a first and a second high-frequency signal carrying the respective receiver input signals $Y_{12}$ and $Y_{22}$ and the accompanying second interference signals $y_{22}$ and $y_{12}$, respectively. Frequencies of the high-frequency signals may be set, for example, between 200 MHz and 800 MHz. The receiver circuit 56 has a control input terminal 57 and is operable to compensate the second interference signals $y_{12}$ and $y_{22}$ by similar control signals and to supply the first and second compensated high-frequency signals to high-frequency output terminals 58 and 59, respectively. The pre-compensation and the last-mentioned compensation are possible in the manner described in the referenced U.S. patents.

Further referring to FIG. 4, a system according to a first embodiment of the present invention comprises in the origination station 11 a pilot signal generator 61 comprising, in turn, a stable pilot signal generator 62 for generating a first pilot signal $Z_{11}$ of a first pilot frequency $F_0$, an oscillator 63 of a stable frequency $F_1$, a frequency multiplier 64 for multiplying the stable frequency $F_1$ by a predetermined factor, such as two, into a multiplied frequency $2F_1$, and frequency converters 65 and 66 for converting the pilot signal $Z_{11}$ by the stable and the multiplied frequencies $F_1$ and $2F_1$ to second and third pilot signals $Z_{21}$ and $Z_{31}$ of second and third pilot frequencies $F_0 + F_1$ and $F_0 + 2F_1$, respectively. In addition to the functions described hereinabove, the transmitter circuit 53 duplexes the first pilot signal $Z_{11}$ supplied to a pilot terminal 67 thereof and the transmitter output signal $X_{11}$ and also duplexes both second and third pilot signals $Z_{21}$ and $Z_{31}$ supplied to other pilot terminals 68 and 69 thereof, respectively, and the other transmitter output signal $X_{21}$. The repeater station 40 converts the first pilot frequency $F_0$ to a first repeater pilot frequency $F_0 + F_{s1}$ and the second and third pilot frequencies $F_0 + F_1$ and $F_0 + 2F_1$ to second and third repeated pilot frequencies $F_0 + F_1 + F_{s2}$ and $F_0 + 2F_1 + F_{s2}$. Thus, the first pilot signal $Z_{11}$ and the second and third pilot signals $Z_{21}$ and $Z_{31}$ reach the receiver input terminals 21 and 22 so a first received pilot $Z_{12}$ and second and third received pilots $Z_{22}$ and $Z_{32}$ together with the receiver input signals $Y_{12}$ and $Y_{22}$, respectively. As is the case with the second interference signals $y_{12}$ and $y_{22}$ superposed on the receiver input signals $Y_{22}$ and $Y_{12}$, a first pilot interference signal $z_1$ and second and third pilot interference signals $z_2$ and $z_3$ are superposed on the receiver input signals $Y_{22}$ and $Y_{12}$, respectively. The first high-frequency signal therefore carries also the second and third pilot interference signals $z_2$ and $z_3$ in addition to the first received pilot $Z_{12}$. The second high-frequency signal similarly carries the first pilot interference signal $z_1$ together with the second and third received pilots $Z_{22}$ and $Z_{32}$.

Still further referring to FIG. 4, the system according to the first embodiment comprises in the destination station 12 a phase-frequency difference detector 71 responsive to the first and second high-frequency signals for detecting in effect the frequency and/or phase difference $F_{s1} \sim F_{s2}$. The detector 71 comprises a first local oscillator 72 of a first local frequency C, a first frequency converter 73 for converting by the local frequency C the first high-frequency signal to a first intermediate frequency signal which includes a first reception pilot signal $z_{12}'$ of a first reception pilot frequency $F_0 + F_{s1} - C$ and components resulting from the receiver input signal $Y_{12}$, the compensated second interference signal $y_{22}$, and the second and third pilot interference signals $z_2$ and $z_3$, and a second frequency converter 74 for converting also by the local frequency C the second high-frequency signal to a second intermediate frequency signal which includes second and third reception pilot signals $Z_{22}'$ and $Z_{32}'$ of second and third reception pilot frequencies $F_0 + F_1 + F_{s2} - C$ and $F_0 + 2F_1 + F_{s2} - C$ and components resulting from the other receiver input signal $Y_{22}$, the other second interference signal $y_{12}$, and the first pilot interference signal $z_1$. Frequencies of the first and second intermediate frequency signals may be selected, for example, between 10 MHz and 100 MHz. A band-pass filter 75 for the first reception pilot frequency $F_0 + F_{s1} - C$ allows passage therethrough of the first reception pilot signal $Z_{12}'$ and rejects the components resulting from the second and third pilot interference signals $z_2$ and $z_3$ and others. A pair of band-pass filters 76 and 77 for the second and third reception pilot frequencies $F_0 + F_1 + F_{s2} - C$ and $F_0 + 2F_1 + F_{s2} - C$ allow passage therethrough of the second and third reception pilot signals $Z_{22}'$ and $Z_{32}'$ and reject all other components including those resulting from the first pilot interference signal $z_1$. The second reception pilot signal $Z_{22}'$ is supplied to a frequency multiplier 78 for multiplying the second reception pilot frequency $F_0 + F_1 + F_{s2} - C$ by the predetermined factor for which two is selected hereinabove. A frequency converter 79 converts the second reception pilot frequency multiplied by two $2F_0 + 2F_1 + 2F_{s2} - 2C$ by the third reception pilot frequency $F_0 + 2F_1 + F_{s2} - C$ to a twice converted pilot frequency $F_0 + F_{s2} - C$. It will not be appreciated that the difference between the first reception pilot frequency and the twice converted pilot frequency is equal to the angular frequency difference $F_{s1} \sim F_{s2}$ and that Doppler frequency shifts and a frequency drift of the first local frequency, if any, have no effects on the last-mentioned difference.

Referring to FIG. 4 once again, the system according to the first embodiment comprises in the destination station 12 a phase-frequency difference remover 91 comprising, in turn, a second local oscillator 92 of a second local frequency and third and fourth frequency converters 93 and 94 for converting the first and second high-frequency signals by the second local frequency to produce a third intermediate frequency signal which includes, among others, components resulting from the receiver input and the second interference signals $Y_{12}$ and $y_{22}$ and a fourth intermediate frequency signal which likewise includes components resulting from the other receiver input and second interference signals $Y_{22}$ and $y_{12}$. Frequencies, hereafter designated by $F_{22} + F_{s1}$ and $F_{22} + F_{s2}$ of the third and fourth intermediate frequency signals may be a little higher than the frequencies of the first and second intermediate frequency signals. When the latter frequencies are of the order of, for example, 9 MHz, the former frequencies may be of the order of 11 MHz. The remover 91 further comprises a third local oscillator 95 of a third local frequency, frequency shifters 96 and 97 for shifting the first reception pilot frequency $F_0 + F_{s1} - C$ and the twice converted pilot frequency $F_0 + F_{s2} - C$ to first and second shifted frequencies, and frequency converters 98 and 99 for converting the third and fourth intermediate frequency signals by the first and second shifted frequencies to derive first and second angular frequency difference removed signals of frequencies equal to the frequencies $F_{12}$ and $F_{22}$, respectively. The difference removed signals correspond to the receiver input signals $Y_1$ and $Y_2$ described in conjunction with FIGS. 1 and 2 and are supplied to the interference signal detector 25 of the structure depicted in FIG. 2.

Figure 5:
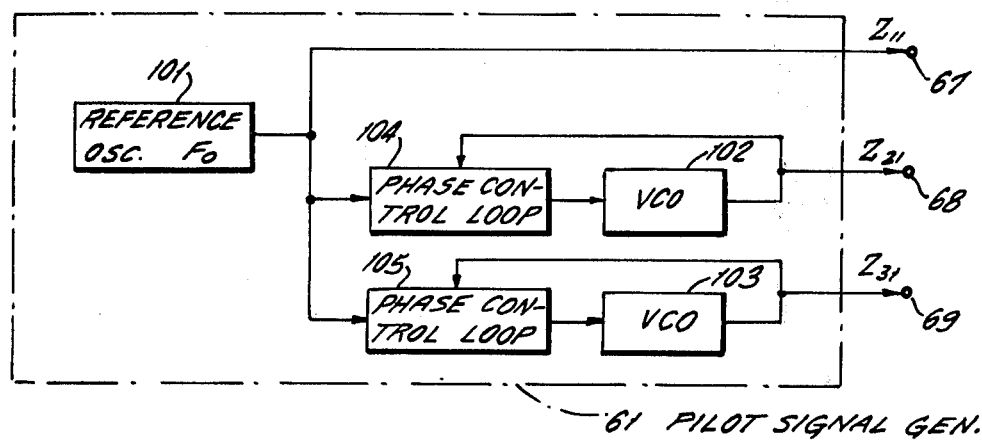
FIG. 5 is a block diagram of a modification of a pilot signal generator of the system illustrated in FIG. 4.

Turning to FIG. 5, the pilot signal generator 61 may be a frequency synthesizer known in the art. More particularly, the frequency synthesizer for the instant purpose comprises a reference oscillator 101 for producing the above-mentioned first pilot signal $Z_{11}$ of the first pilot frequency, first and second voltage-controlled oscillators 102 and 103 for producing voltage-controlled signals of frequencies approximately equal to the second and third pilot frequencies, respectively, and phase control loops represented by blocks 104 and 105 for automatically controlling the phases of the voltage-controlled signals with reference to the first pilot signal $Z_{11}$. The voltage-controlled oscillators 102 and 103 produce the second and third pilot signals $Z_{21}$ and $Z_{31}$, respectively.

Referring to FIG. 6, the phase-frequency difference detector 71 may comprise the filters 75 through 77 described hereinabove, a frequency subtractor 108 for subtracting in frequency the second reception pilot signals $Z_{22}'$ from the third reception pilot signal $Z_{32}'$ to produce a subtraction signal of a frequency equal to the stable frequency $F_1$, and a frequency shifter 108 for shifting the frequency of the first reception pilot signal $Z_{12}'$ by the subtraction signal to derive a signal of a frequency equal to $F_0 + F_1 + F_{s1} - C$, which may be supplied to the third frequency converter 93. The second reception pilot signal $Z_{22}'$ of the frequency equal to $F_0 + F_1 + F_{s2} - C$ may be supplied directly to the fourth frequency converter 94. It is now obvious that the phase-frequency difference detector 71 may similarly comprise a combination of a frequency multiplier, a frequency adder or subtractor, and a nonlinear circuit to derive two output signals of frequencies having a difference equal to the frequency and/or phase difference $F_{s1} \sim F_{s2}$.

Referring now to FIG. 7, a satellite communication link including a system according to a second embodiment of this invention comprises a transponder carried by a satellite and serving as first and second repeater stations 140 and 142 to which a first and a second frequency band are allotted, respectively. The first station 140 has first repeater input terminals 116R and 116L for receiving in a first receiving antenna beam first repeater input signals of dextrorotary and levorotary elliptically polarized and modulated electromagnetic waves or signals, respectively, and first repeater output terminals 117L and 117R to transmitting first repeater output signals of other levorotary and dextrorotary elliptically polarized and modulated signals in a first transmitting antenna beam. The second station 142 similarly has second repeater input terminals 118R and 118L of a second receiving antenna beam and second repeater output terminals 119L and 119R of a second transmitting antenna beam. The stations 111 and 112 may be provided by two transponders carried by different satellites, respectively. It is now surmised that the directivity of the first receiving antenna beam is identical with that of the second antenna beam.

Further referring to FIG. 7, first, second, third, 110, 111, 112, 113, and 114 are capable of transmitting communication signals with pertinent polarities in whichever of the first and second frequency bands to the first and second repeater stations 140 and 142. Sixth, seventh, and eighth ground stations 115, 116, and 117 are covered by the first transmitting antenna beam and capable of receiving communication signals from the first repeater station 140 in the first frequency band with pertinent polarities. Ninth and tenth ground stations 118 and 119 are covered by the second transmitting antenna beam and capable of receiving communication signals from the second repeater station 142 in the second frequency band and with relevant polarities. The first ground station 110 has a transmitter output terminal 121 for transmitting a first transmitter output signal $X_{11}$ carried by a dextrorotary carrier wave or signal of the first frequency band with a first pilot signal $Z_1$ superposed thereon and also a second transmitter output signal $X_{21}$ carried by another dextrorotary carrier signal of the second frequency band together with a second pilot signal $Z_2$. The station 110 has another transmitter output terminal 132 for transmitting a third transmitter output signal $X_{31}$ carried by a levorotary carrier signal of the first frequency band together with third and fourth pilot signals $Z_3$ and $Z_4$ and also a fourth transmitter output signal $X_{41}$ on another lavorotary carrier signal of the second frequency band together with fifth and sixth pilot signals $Z_5$ and $Z_6$. In this manner, the second through fourth ground stations 111 through 113 transmit a fifth transmitter output signal $X_{51}$ together with the first pilot signal $Z_1$, a sixth transmitter output signal $X_{61}$ also with the first pilot signal $Z_1$, and a seventh transmitter output signal $X_{71}$ together with the third and fourth pilot signals $Z_3$ and $Z_4$, respectively. The fifth ground station 114 transmits in the second frequency band an eighth transmitter output signal $X_{81}$ carried by a dextrorotary carrier signal together with the second pilot signal $Z_2$ from a transmitter output terminal thereof and also a ninth transmitter output signal $X_{91}$ on a levorotary carrier signal together with the fifth and sixth pilot signals $Z_5$ and $Z_6$ from another transmitter terminal thereof.

Still further referring to FIG. 7, let it be assumed that a cross-polarization interference signal $y_{71}$ is produced from the fourth transmitter output signal $X_{71}$ and superposed on the third transmitter output signal $X_{61}$ and that a pair of cross-polarization interference signals $y_{81}$ and $y_{91}$ is introduced from the eighth and ninth transmitter output signals $X_{81}$ and $X_{91}$ into the ninth and eighth transmitter output signals $X_{91}$ and $X_{81}$, respectively. A receiver input terminal of the seventh ground station 116 is for levorotary communication signals and designated by 136. Likewise, a receiver input terminal of the eighth ground station 117 for dextrorotary communication signals is designated by 137. The first repeater station 140 receives at the input terminal 116R the first and fifth transmitter output signals $X_{11}$ and $X_{51}$, both together with the first pilot signal $Z_1$, and also the sixth transmitter output signal $X_{61}$ together with the first pilot signal $Z_1$ again and with the interference signal $y_{71}$. The station 140 retransmits or repeats from the output terminal 117L the sixth transmitter output signal $X_{61}$, among others, with a first frequency conversion difference $F_{s1}$. The repeated signal reaches the receiver input terminal 136 as a receiver input signal $Y_{62}$ together with the first pilot and the interference signals $Z_1$ and $y_{71}$. The repeater station 140 receives at the input terminal 116L the third and seventh transmitter output signals $X_{31}$ and $X_{71}$, both together with the third and fourth pilot signals $Z_3$ and $Z_4$, and repeats from the output terminal 117R the seventh transmitter output signal $X_{71}$, among others, with a second frequency conversion difference $F_{s2}$. The repeated signal reaches the receiver input terminal 137 as a receiver input signal $Y_{72}$ together with the third and fourth pilot signals $Z_3$ and $Z_4$. It is now understood that the communication signals reaching another receiver intput terminal of the seventh ground station 116 are accompanied by the third and fourth pilot signals $Z_3$ and $Z_4$ and that the station 116 is capable of detecting the angular frequency difference $F_{s1} \sim F_{s2}$ by the use of correlations between the first pilot signal $Z_1$ and the third and fourth pilot signals $Z_3$ and $Z_4$. Consequently, it is possible to detect in effect the interference signal $y_{71}$ superposed on the receiver input signal $Y_{61}$ and thereby to compensate the interference. Similarly, each of the ninth and tenth ground stations 118 and 119 is capable of detecting the interference signals $y_{81}$ and $y_{91}$ received together with the fifth and sixth pilot signals $Z_5$ and $Z_6$ and with the second pilot signal $Z_2$, respectively, by the use of those correlations between the second pilot signal $Z_2$ and the fifth and sixth pilot signals $Z_5$ and $Z_6$ which may be equal or unequal to the correlations between the first pilot signal $Z_1$ and the third and fourth pilot signals $Z_3$ and $Z_4$ and may be correlated or uncorrelated to the last-mentioned correlations. It is thereby feasible to compensate the interference signals $y_{81}$ and $y_{91}$.

While a few preferred embodiments of this invention have so far been described, it should be clearly understood that various other embodiments of this invention are possible within the scope of the appended claim. For example, it is readily feasible to use four or more pilot signals, instead of three as described hereinabove, correlated to one another and to send these pilot signals together with one and the other of each pair of transmitter output signals. Also, the predetermined factor for the correlationship may be three or more. If additional interference occurs between the destination station and the repeater station nearest thereto, it is necessary for detection and compensation of the interference described in connection with FIGS. 3 and 7 that the additional interference be already compensated by the use of the receiver circuit 56. This is possible by using the repeater output signals resulting from the transmitter output signals, such as the signals $X_{31}$ and $X_{71}$ depicted in FIG. 7, between which no interference is present. Alternatively, this is rendered feasible by providing a pilot signal generator of the type illustrated in FIG. 4 at 61 or with reference to FIG. 5 in a transmitter of the last-mentioned repeater station. Provision of the pilot signal generator in each repeater station is therefore desirable. Likewise, it is preferred to provide in the receiver of each repeater station the receiver circuit 56, the angular frequency difference detector 71, the angular frequency difference remover 91, and the interference signal detector 25 although the interference signal detector 25 need not be capable of reproducing the original information signals.

What is claimed is:

1. In a system for a radio communication link comprising transmitting means for transmitting a plurality of transmitter output signals in a first common frequency band, repeater means for receiving the transmitter output signals as repeater input signals and for retransmitting said repeater input signals in a second common frequency band as repeater output signals with frequency conversion carried out between said repeater input signals and the respective repeater output signals, and a receiver for receiving the repeater output signals as receiver input signals, said system comprising pilot transmission means in said transmitting means for transmitting a plurality of transmission pilot carrier signals together with said transmitter output signals and pilot reception means in said receiver for separating those reception pilot carrier signals from said receiver input signals which result from the respective transmission pilot carrier signals, said transmitter output signals comprising a first and a second transmitter output signal, said receiver input signals comprising a first and a second receiver input signal resulting from said first and second transmitter output signals, respectively, and having a phase-frequency difference therebetween as a result of said frequency conversion, said reception pilot carrier signals being for use in cancelling at least from one of said first and second receiver input signals an interference signal inevitably introduced into said one receiver input signal from one of said first and second transmitter output signals that results in the other of said first and second receiver input signals, the improvement wherein said pilot transmission means comprises:

pilot signal generating means for generating at least one first transmission pilot signal and at least two second transmission pilot signals having predetermined correlations, respectively, with said first transmission pilot signal; and means for transmitting said first transmission pilot signal and said second transmission pilot signals as said transmission carrier signals at least together with said first and second transmitter output signals, respectively;

said pilot reception means comprising:

first means for separating a first reception pilot signal and second reception pilot signals from said first and second receiver input signals, respectively, said first and second reception pilot signals resulting from the respective ones of said first and second transmission pilot signals, said phase-frequency difference being provided between said first reception pilot signal and said second reception pilot signals by the frequency conversion to which said first and second transmission pilot signals are subjected together with said repeater input signals at said repeater means; and second means responsive to said first and second reception pilot signals for detecting said phase-frequency difference by the use of said correlations.

* * * * *